Feb. 21, 1967　　　K. EICKMANN　　　3,305,195
KINETICAL ENERGY TRANSFORMING AND PROPORTIONATELY
DIVIDING FLUID DRIVE
Filed May 5, 1965　　　　　　　　　5 Sheets-Sheet 1

INVENTOR.
KARL EICKMANN
BY
*attorneys*

Feb. 21, 1967 K. EICKMANN 3,305,195
KINETICAL ENERGY TRANSFORMING AND PROPORTIONATELY
DIVIDING FLUID DRIVE
Filed May 5, 1965 5 Sheets-Sheet 2

INVENTOR.
KARL EICKMANN
BY

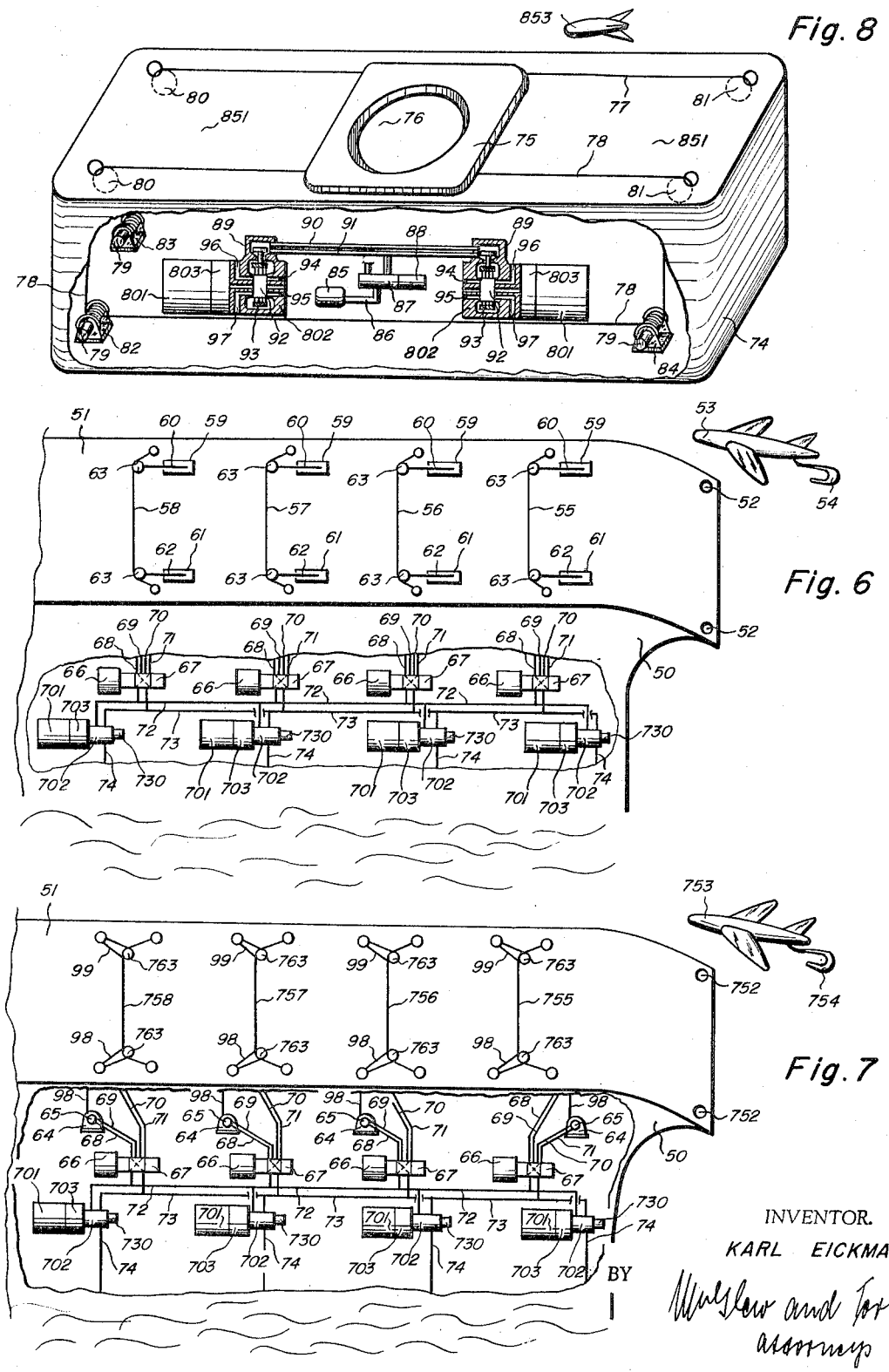

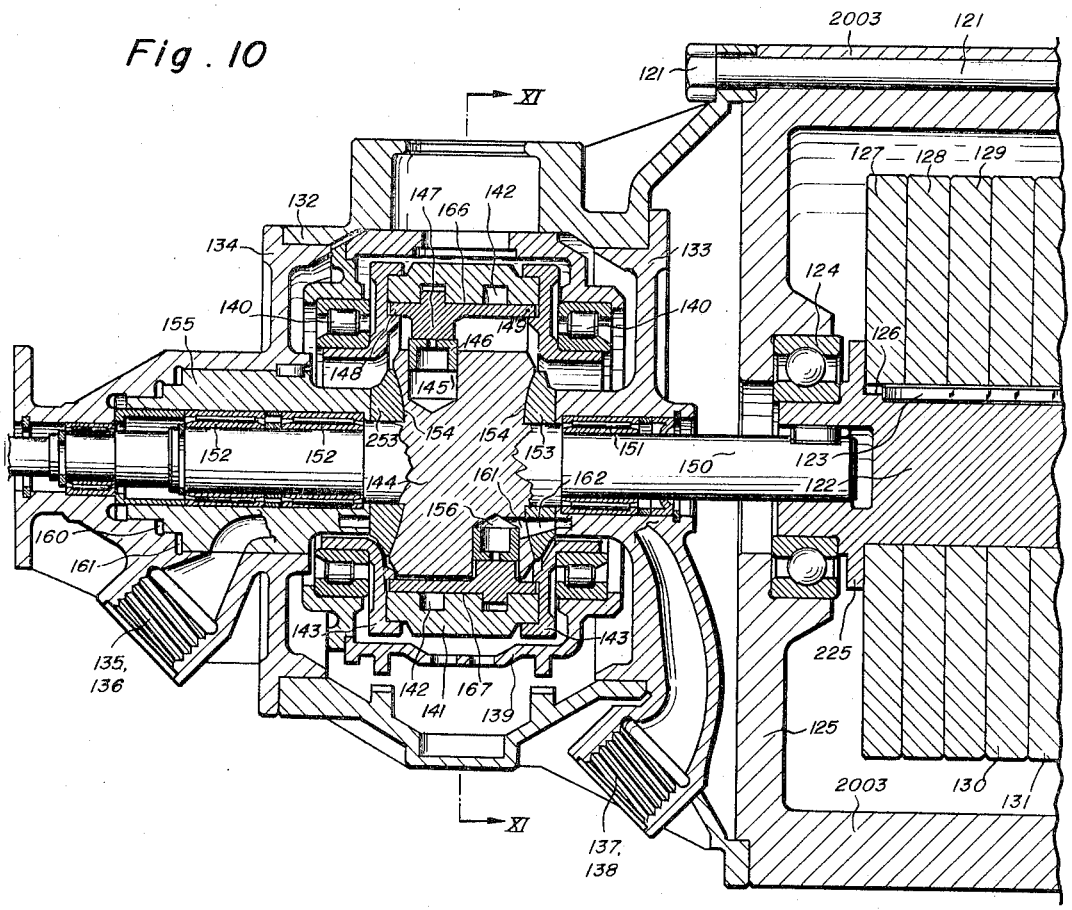

United States Patent Office 3,305,195
Patented Feb. 21, 1967

3,305,195
KINETICAL ENERGY TRANSFORMING AND PROPORTIONATELY DIVIDING FLUID DRIVE
Karl Eickmann, 2420 Isshiki Hayama-machi,
Kanagawa-ken, Japan
Filed May 5, 1965, Ser. No. 453,278
19 Claims. (Cl. 244—63)

This invention relates to fluid power generating, transmitting and utilizing systems, such as hydraulic power generating, transmitting and utilizing systems, which have intermittent peak power demands or loads greatly in excess of the normal power demand or load. More particularly, the present invention is directed to a fluid pressure generating, transmitting and utilizing system of this type in which novel means are provided for storing power in the form of kinetic energy during normal operation of the system for release during peak demands or loads, and novel means for proportioning the delivered fluid pressure energy between two or more fluid pressure operated devices.

There are many kinds of hydraulic drives or transmissions for vehicles or machines, and which have proved satisfactory in operation. However, there are certain kinds of vehicles or machines which do not require a high power input over a long period of time. Instead, these machines or vehicles require a relatively low power input during the greater part of a period of operation while requiring very high power inputs at intermittent or periodic intervals. Hydraulic drives or transmissions for these latter vehicles or machines, as hitherto proposed, have generally used a high capacity hydraulic power generating means capable of supplying the peak power demand of the vehicles or machines. Consequently, such hydraulic drives or transmissions have been uneconomical in operation as, during the greater part of the time of operation, the power generating means operates at only a small fraction of its capacity.

An object of the present invention is to provide a fluid drive for machines which require a relatively small power input during the majority of an operating period and require very high power inputs at intermittent intervals, and in which the fluid pressure generating means has an output power capacity adapted to the normal load or demand thereon but substantially less than the intermittent peak demand or load thereon, while still being capable of supplying the peak power demand or load.

Another object of the invention is to provide such a fluid drive which is economical in operation, low in capital cost, economical in power consumption, simple in design and manufacture, positive in operation, and having a long satisfactory service.

A further object of the invention is to provide such a fluid drive including rotary pump means delivering fluid under pressure to a plurality of pressure fluid supply lines in equal or proportional quantities, and connected to rotating or revolving masses storing kinetic energy during normal operation of the rotary pump means and transferring part of the stored kinetic energy, through the pump means, into the supply lines in the form of fluid pressure upon the occurrence of peak power demands or loads.

Still another object of the invention is to provide a combination of a plurality of such rotary pump means each operatively associated with a kinetic energy storing and transferring means as a battery serving as a common power source for one load device or for a plurality of load devices using power in the form of fluid pressure.

A further object of the invention is to provide novel arresting gears for aircraft utilizing fluid drives of the type just-mentioned.

Yet another object of the invention is to provide an improved catapult device for catapulating flying objects and utilizing the above-mentioned fluid drive.

A further object of the invention is to provide an improved arresting device for flying objects and including a receiver accelerated and deccelerated by the above-mentioned fluid drive of the invention.

Still another object of the invention is the transformation of kinetic energy into proportionate separate fluid power energy flows.

A further object of the invention is the transformation of kinetic energy into proportionate and proportionately variable separated fluid power energy flows wherein the rate of flow, the fluid flow quantity, the fluid pressure, the movement velocities and the driving forces are adjustable and variable.

In accordance with the invention, a rotating wheel is assembled between a driving means and a rotary fluid pump or compressor driven by the driving means, this rotating wheel being mounted on the output shaft of the driving means, on the input shaft of the fluid pump or compressor, or on both shafts and having a mass concentration preferably substantially on or adjacent its outer periphery. This rotating wheel thus rotates with the driving means and with the rotary pump or compressor and, as it rotates, it develops and stores a large quantity of kinetic energy in its mass concentration.

If the driven machine connected to the fluid drive is operating at only a relatively small power requirement, only a relatively small power is required to drive the wheel and the pump or compressor to produce the fluid flow required to drive the fluid pressure actuator of the driven machine. If the driven machine now requires the short time peak power, a very high power or force must be supplied to the fluid pressure actuator and the pressure in the fluid pressure actuator increases suddenly. Since the pump or compressor communicates with the fluid pressure actuator, there is a sudden increase of pressure in the pump or compressor. If the driving motor and the pump or compressor were not supplied with the kinetic energy storing and transfer means, the sudden rise of pressure in the pump or compressor would stall the drive means because the drive means has a capacity coordinated with the normal lower load on the machine. Thus, the drive means would not be able to supply the power needed to drive the pump or compressor during the short time peak demand on the latter. As stated, in prior fluid drives for machines having short time intermittent peak demands, it has been customary to provide a driving motor having a driving power sufficient to supply the peak demand, and this was uneconomical when operating with substantially less than the peak power demand.

With the invention arrangement, however, such stalling of the driving motor will not occur. Due to the relatively large amount of kinetic energy stored in the rotating wheel during rotation thereof with the driven machine requiring only a much smaller fluid pressure delivery, the kinetic energy transferred from the rotating wheel to the pump or compressor supplies the extra energy required to drive the pump or compressor to meet the peak demand. This kinetic energy is transferred either in part or completely during the short time intermittent peak demands, and is converted into an increase in the fluid pressure or into a higher fluid delivery rate and pressure or into a decreased delivery rate at a higher pressure.

The fluid drive of the invention, by virtue of the storage of kinetic energy and the transfer of the kinetic energy into fluid pressure energy, provides an arrangement capable of meeting short time peak demands while using a drive means, for a rotary pump developing the fluid pressure, which has a capacity only of the order of that required for low load operation in between the peak demand periods. The power plants may be of any type, such as electric motors, gasoline or diesel engines, gas turbines, steam turbines, or the like.

For an understanding of the principles of the invention, reference is made to the following description of typical embodiments thereof as illustrated in the accompanying drawings.

In the drawings:

FIGS. 6 and 7 are views, similar to FIG. 5, illustrating the invention as applied to a novel aircraft arresting arrangement particularly applicable to aircraft carriers;

FIG. 8 is a somewhat schematic perspective view illustrating the fluid drive of the invention as applied to a novel arresting machine for sensing an approaching flying object and accelerating a receiver, for the flying object, to a speed of the order of that of the flying object;

FIG. 9 is an axial sectional view illustrating a part of a modified form of fluid drive embodying the invention, in which the kinetic energy storage means comprises a plurality of revolving or rotating masses;

FIG. 10 is an axial sectional view illustrating a preferred embodiment of a dual output variable delivery and reversible pump used as the rotary pump of the fluid drive of the invention.

Figure 1:
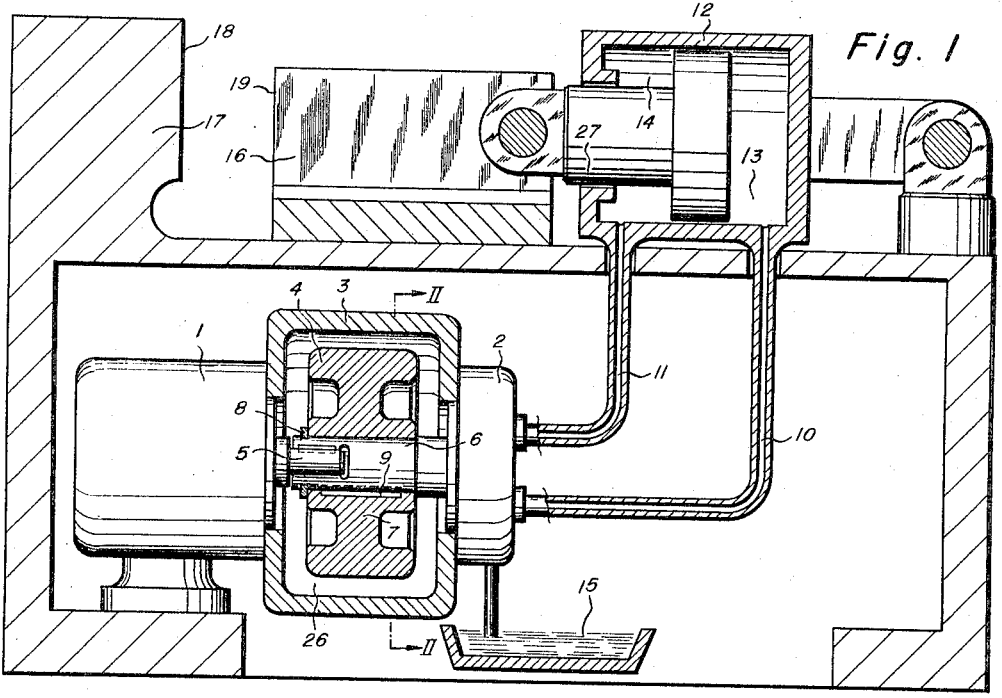
FIG. 1 is a simplified vertical sectional view through a horizontal injection press utilizing the fluid drive of the invention.
Figure 2:
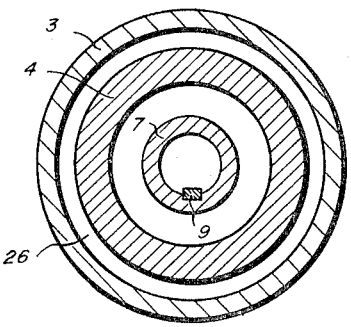
FIG. 2 is a cross sectional view taken on the line II—II of FIG. 1.

Referring first to FIGS. 1 and 2, the fluid drive illustrated therein includes a driving motor 1 driving a rotary pump or compressor 2. Motor 1 is illustrated as an electric motor, and pump or compressor 2 is a hydraulic pump or compressor which may have either a fixed or variable displacement in accordance with the requirements. A flanged casing 3 interconnects motor 1 and pump 2, and defines an interior space 26 containing the kinetic energy storage and transfer means of the invention.

Motor 1 has an output or drive shaft 5 which is connected to the input or drive shaft 6 of pump 2, shafts 5 and 6 being coaxial. In a known manner, shaft 5 may have a reduced portion extending coaxially into shaft 6, or shaft 6 may have a reduced portion extending coaxially into shaft 5. Alternatively, shafts 5 and 6 may be constrained to rotate with each other by means of a suitable key means. In accordance with the invention, a rotating wheel 7 is mounted within casing 3 in the interior space 26 and is connected to either one or both shafts 5 and 6. A collar 8 fixes wheel 7 against axial displacement, and a key 9 serves as the driving connection between wheel 7 and one or both of the shafts 5 and 6.

The mass concentration 4 of wheel 7 is arranged at the periphery of this wheel. A relatively large amount of kinetic energy can be stored in the masses 4 during rotation of wheel 7, the kinetic energy being dependent upon the mass concentration 4, the radial distance of mass concentration 4 from the common axis of shafts 5 and 6, and the angular velocity of wheel 7. The kinetic energy will be built up or developed by driving motor 1 when pump 2 is delivering either a small flow of fluid or a flow under reduced pressure. The kinetic energy stored in mass concentration 4 is available to assist the drive of pump 2 during the periodic or intermittent short time peak demands on pump 2 when there is present at the output of pump 2 a sudden pressure increase, delivery increase, or pressure increase combined with delivery increase. The kinetic energy stored in mass concentration 4 tends to maintain wheel 7 rotating at a relatively high speed, and thus the kinetic energy is transformed into fluid pressure energy represented by an increased flow from pump 2 or an increase in the fluid pressure produced by pump 2, or into a combination of increased fluid flow and increased fluid pressure. This conversion of the kinetic energy into fluid pressure energy decreases the angular velocity of motor 1, pump 2 and wheel 7. However, the available kinetic energy is quickly restored once the peak demand on pump 2 has been ended, as motor 1 will again come up to speed and bring wheel 7 up to speed during lower power demand periods between the intermittent peak demand periods. Consequently, motor 1 need be only of a sufficient capacity to supply the low power required in between the short time peak demand periods.

The mounting of wheel 7 directly on one or both of the shafts 5 and 6 eliminates the necessity for any transmission means between these shafts and the wheel 7. An advantageous feature is the enclosure of wheel 7 within the interior space 26 of casing 3, as this prevents any accidents resulting from contact with rotating parts. A further advantage of the mounting of wheel 7 with its mass concentration 4 directly on one or both of the shafts 5 and 6 is that motor 1 and pump 2 have a relatively high angular velocity. In known arrangements where kinetic energy is stored in a rotating fly wheel or the like, the rotating machines have had a much less angular velocity and thus have required a fly wheel having a much larger diameter or a greater mass concentration. With the arrangement of the invention, a relatively small diameter wheel 7 can be used with a relatively smaller mass concentration 4, due to the high angular velocity of motor 1 and pump 2. This results in decreased production cost for the fluid drive unit of the invention.

In FIGS. 1 and 2, the fluid drive of the invention is applied to an injection press having a body 17 and a slide 16 reciprocated by a piston 27 operating in a cylinder 12. This is a known type of injection press which includes opposed faces 18 and 19 on body 17 and slide 16, respectively, for mounting suitable tools. Piston 27 divides the interior of cylinder 12 into two spaces 13 and 14, space 13 being connected to one of the two outputs of pump 2 through a supply line 10 and space 14 being connected to the other output of pump 2 through a supply line 11. Additional valves and other control means may be provided for press 17, and a fluid reservoir 15 is also provided.

When fluid under pressure is delivered through supply line 10 to space 13 behind piston 27 in cylinder 12, slide 16 is moved toward body 17. During the major portion of this movement, there is substantially no resistance to the displacement of slide 16 and therefore only a relatively small amount of power is required to be supplied to line 10. However, during the short time when the tools mounted on faces 18 and 19 are engaged under pressure, the resistance in cylinder space 13 will increase many times. This greatly increases the pressure in space 13 and thus the load on pump 2. However, at this time, the kinetic energy stored in mass concentration 4 of wheel 7 is transferred into fluid power to produce a higher pressure in cylinder space 13 by maintaining substantially full speed operation of pump 2. After the pressing operation, slide 16 is retracted by the delivery of fluid under pressure through line 11 to space 14 in cylinder 12. Very little power is required during such retraction, so that motor 1 can act again to bring wheel 7 up to speed to restore the kinetic energy of mass concentration 4 to its full value.

Figure 3:
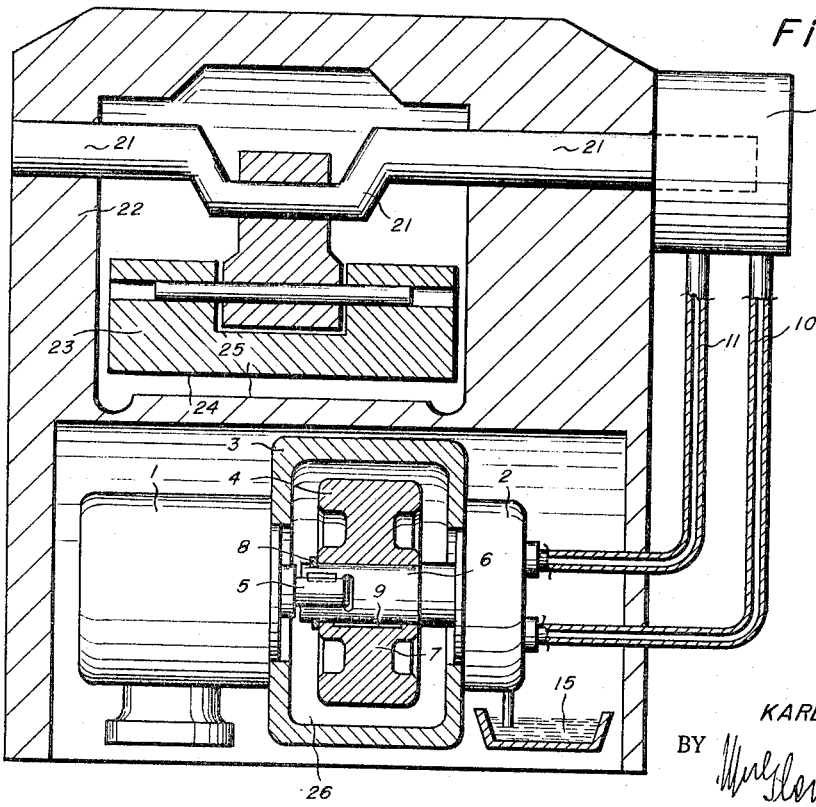
FIG. 3 is a view, similar to FIG. 1, illustrating a simplified crank shaft press utilizing the fluid drive of the invention.

The same fluid drive unit used in FIGS. 1 and 2 is also used to drive the crank-type press shown in FIG. 3. In FIG. 3, supply lines 10 and 11 are connected to a rotary fluid motor 20 which is connected, either directly or indirectly, to the crank shaft 21 of the press. Shaft 21 is borne and positioned inside of press body 22, and drives press slide 23 in a known manner. In further accordance with a known procedure, tool mounting faces 24 and 25 are provided on slide 23 and body 22, respectively.

It has been customary in the prior art to rotate crank shaft 21 by mechanical means and to associate fly wheels with crank shaft 21 in order to provide the high torque necessary during the short time pressing interval. The necessary kinetic energy required during the short time pressing interval was supplied from the mass concentration on the fly wheel. Additionally, it has been customary to provide clutches between the fly wheel and crank shaft 21 in order to interrupt rotation of crank shaft 21. Since crank shaft 21 rotates at a relatively slow speed, it was necessary to use relatively massive and large diameter fly wheels.

These disadvantages are overcome by the fluid drive of the present invention wherein rotary fluid motor 20 drives crank shaft 21 directly, with the peak power demand being met by the kinetic energy stored in the mass concentration 4 of wheel 7 normally rotating at a high angular velocity. Furthermore, the fluid drive of the invention enables the elimination of clutches between motor 20 and crank shaft 21, because the supply of fluid to motor 20 can be controlled by suitable adjusting means such as valves and the like.

Figure 4:
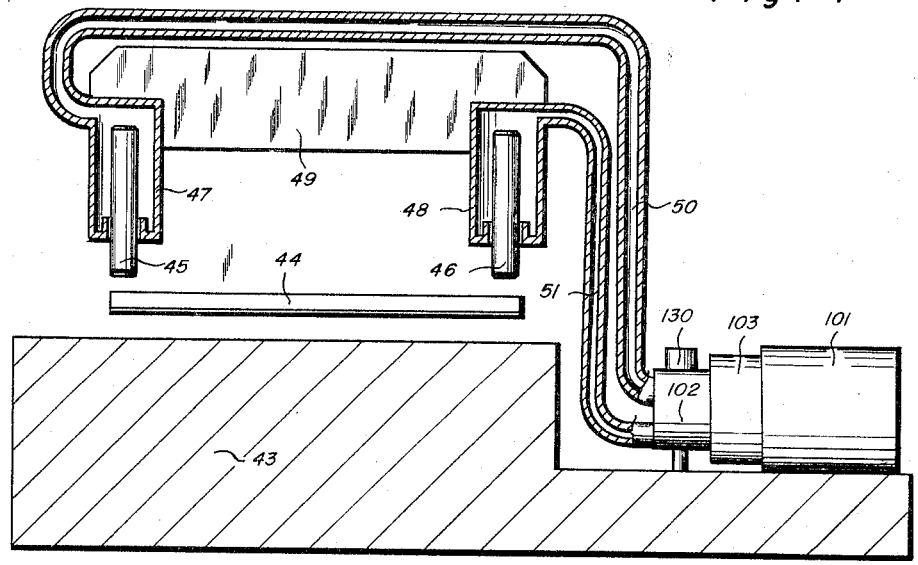
FIG. 4 is a vertical cross sectional view illustrating the fluid drive of the invention as applied to drive two rams, with the rotary pump having two pressure fluid outlets each connected to a separate supply line.

FIG. 4 illustrates the application of the fluid drive of the invention to a press including two hydraulic cylinders 47 and 48 having respective pistons or rams 45 and 46 adapted to push against a knife or bar 44. The cylinders are mounted on a machine head 49 positioned above machine bed 43. In this type of press, the pistons 45 or 46 or both thereof, in moving downwardly, force knife or plate 44 downwardly so that, for example, steel plates or other materials can either be cut by knife 44 or pressed together by the element 44.

The fluid drive includes a driving motor or the like 101 mounted on machine bed 43 and connected by casing 103 to a multiflow pump 102 provided with a controller 130 for varying the pump delivery. In this example, multiflow pump 102 provides two equal outputs through the two supply lines 50 and 51 connected to the cylinders 47 and 48, respectively. In the same manner as described for FIGS. 1, 2 and 3, a rotary wheel having a mass concentration on its periphery is mounted within casing 103 on the motor shaft, the pump shaft, or both shafts.

Figure 11:
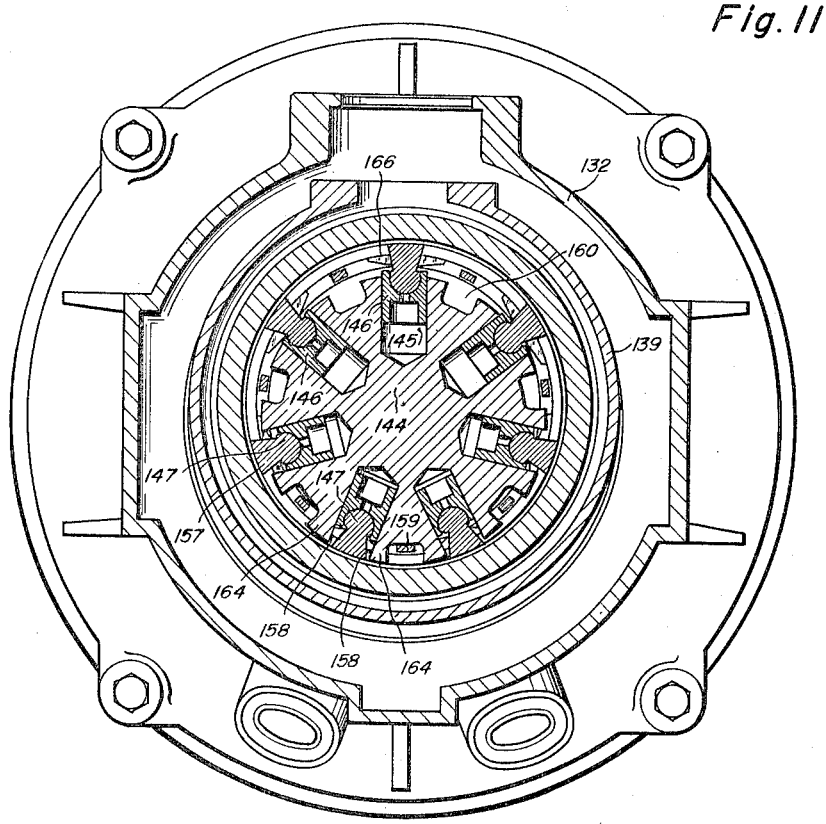
FIG. 11 is a diametric sectional view taken on the line XI—XI of FIG. 10.

Pump 102 is a variable and reversible radial piston-type pump having dual outputs whose delivered quantities are proportional. An example of a preferred embodiment of pump 102 is shown in FIGS. 10 and 11, which will be described hereinafter. The fluid pressure supplied through lines 50 and 51 to cylinders 47 and 48 moves pistons 45 and 46 downwardly with proportional velocity. As soon as the pistons reach their limiting position, the delivery of pump 102 is decreased by the control means 130. The pump delivery is adjusted either to be a very small quantity or to be zero and, after the press work is completed, the pump reverses its delivery direction to provide a return flow through passages 50 and 51 to retract pistons 45 and 46 upwardly. Such retraction could be assisted, for example, by spring means or by additional fluid pressure actuator means acting in an upward direction. Of course, instead of the single action rams 45 and 46, it is also possible to provide double-acting rams.

In prior art machines having two different movable elements located in spaced relation, it has been customary to move these parts with an equal or proportional velocity through the medium of mechanical gearing means. However, if the reaction forces become too large, such mechanical gearing means tends to break. There is also the disadvantage that the operation could not be smoothly effected, as clutch means or the like were used for engaging the gear means. These clutch means also tended to slip or fail.

It has also been proposed to drive such machines hydraulically by pumps having a single output and by dividing the single output by means of fluid dividers into a plurality of outputs to drive the individual pistons or rams. However, such flow dividers are not entirely accurate in dividing the flow and the result is that, if one piston or ram meets a larger resistance than the other, it will move slower than the other and this can result in a breakdown of the machine.

For machines having a smaller horsepower, it has been proposed to use multiflow type axially displaceable plunger pumps to produce separate fluid flows. For the most part, such axial plunger pumps do not have a variable delivery and furthermore they have the great disadvantage that, if the pressure suddenly increases to several atmospheres, the axially moving pistons which slide along an inclined surface have a radial force component suddenly applied thereto. This causes the pistons to wear in their respective cylinders or to tilt therein, so that axial piston pumps are not able to produce, efficiently and without mishap, the desired high pressure and high horsepower which are characteristic of the intermittent peak demands on machines such as shown in FIG. 4 and the other figures of the drawings. Consequently, axial piston pumps are suitable only for small horsepower drives. Additionally, they are not capable of the high angular velocities of gas turbines, because the pistons will then tend to tilt under the centrifugal forces. Consequently, the fluid drive of the present invention does not use axial piston pumps but rather variable and reversible radial piston pumps wherein the pistons are accurately guided through the full stroke thereof. This prevents any tilting of the pistons and enables safe operation of these radial pumps under sudden loads or sudden higher pressures amounting to a value several times higher than can be delivered by the drive means 101. The fluid drive of the present invention overcomes the disadvantages of prior art arrangements for driving machines having two or more displaceable elements which must move with an equal or proportional velocity irrespective of resistance.

Figure 5:
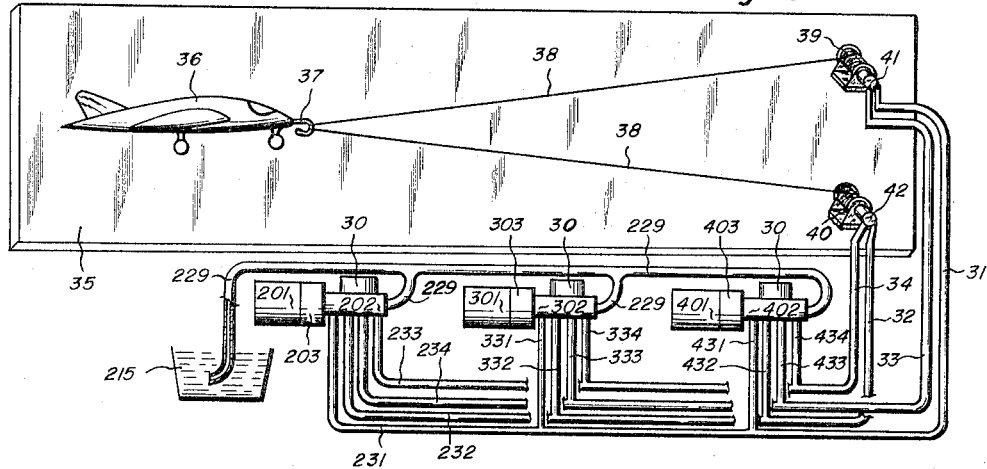
FIG. 5 is a partly schematic and partly perspective view illustrating the fluid drive of the invention as applied to an aircraft catapult device, and further illustrating a plurality of fluid drives connected in parallel to supply the power means of the catapult device.

Referring to FIG. 5, the novel catapulting means illustrated therein is mounted on a base 35 and the object to be launched, such as an aircraft 36, is set onto base 35 and is provided with a hook means 37. A pair of winches 39 and 40 are mounted on body 35 in spaced relation to aircraft 36, and winches 39 and 40 are laterally spaced. A wire extends from winch 39 to winch 40 and is engaged with hook 37. Each winch is driven by one or a plurality of hydraulic motors such as 41, 42.

In order to understand the operation of the catapult means, it must be understood that motors 41 and 42 have to supply a very sudden and very high torque to winch means 39 and 40 in order to be able to accelerate usually heavy objects 36, during a few hundred milliseconds, to a very high speed, for example, from 150 to 200 knots. The high torque required to provide such a high acceleration would not be possible with conventional hydraulic motors, or at least would be very difficult to obtain. Consequently, the driving motors 41 and 42 are preferably high torque and high speed hydraulic motors of the kind disclosed in my U.S. Patent Nos. 2,975,716, 3,099,964, 3,158,103, and 3,111,905, or in others of my U.S. patents or copending U.S. patent applications. These patents disclose hydraulic motors effective to produce 10,000 horsepower or a multiple of 10,000 horsepower, as disclosed, for example, in my U.S. Patent No. 3,158,103. Instead of providing a single hydraulic motor 41 or 42 for each winch 39 or 40, it is possible to connect a plurality of such motors to a common gear transmission driving the winches 39 and 40.

Objects 36, if it is an aircraft, may have a high weight such as 50,000 pounds to 500,000 pounds. The overall length of base body 35 should be as short as possible in order to enable transport of the entire catapult unit into remote places by air, for example, to transport the entire unit into junbles, desert areas, small islands, or the like by air.

A calculation of the acceleration necessary to launch a heavy object 36 in a short distance indicates that very high torques and high power are necessary, the power requirement reaching multiples of 10,000 horsepower. On the other hand, the entire acceleration time should be only a few hundred milliseconds or even only a few milliseconds. It would be very difficult to provide such high power from conventional power plants, which would also be too heavy to be transported any great distance by air and would quite likely have dimensions too large for air transport.

In accordance with the present invention therefore, a plurality of dual output or multiflow pumps 202, 302 and 402, which could be similar in construction to the pump shown in FIGS. 10 and 11 or which could be other kinds of high horsepower and high pressure or variable output two-flow or multiflow pumps. Each pump is provided with a controller 30, and the pumps are loaded from a tank 215 through a supply line 229. Each pump is driven by a respective drive means 201, 301, and 401 and, between each pump and its drive means, there is a casing 203, 303 and 403, respectively, within which the revolving mass concentrations are disposed in the manner already described.

Each pump has two delivery passages and two return passages, such as delivery passages 231 and 232 and return passages 233 and 234 associated with pump 202. Pump 302 has the corresponding passages 331 through 334 and pump 402 has the corresponding passages 431 through 434. Delivery passages 231, 331 and 431 are connected to a common supply line 31, and delivery passages 232, 223 and 432 are connected to a common supply line 32. Similarly, return passages 233, 333 and 433 are connected to a common return line 33, and return passages 234, 334 and 434 are connected to a common return line 34. Supply line 31 is connected to motor 41 and supply line 32 is connected to motor 42, return line 33 extending from motor 41 and return line 34 extending from motor 42.

In order to catapult object 36, wire 38 is drawn away from winches 39 and 40, unwinding from the winches, and its loop is engaged in hook means 37 of object 36. During the time this takes place, all of the pumps and their drive means are rotating at full angular velocity. Control means 30 sets the delivery-quantity adjustment devices of the pumps into the zero position, so that no fluid is supplied to the pumps. This condition continues until the command is given for catapulating object 36. At this instant, the adjusting devices 30 start to increase the pump deliveries from zero to maximum, which must occur in a very short time interval of a few milliseconds or a few hundred milliseconds. During this very short time interval, the delivery of the pumps increases gradually. The rate of increase depends on the strength of wire 38 and on the weight of object 36 and must be so selected that wire 38 will not break under the heavy load to which it is subjected during the acceleration. As the motors 41 and 42 are starting to revolve the winches 39 and 40, the wire 38 is wound up on the winches and draws object 36 forwardly. With the rapid increase of output of the pumps, the angular velocity of motors 41 and 42, and thus the winding velocity of wire 38 upon winches 39 and 40, is rapidly increased. This accelerates object 36 to the desired speed so that it becomes airborne. After object 36 is airborne, wire 38 disengages from hook means 37 and the catapulating process is completed.

As soon as this process is completed, a command is given automatically by a sensing device or by an electronic measuring device to the control means 30 for immediate adjustment of the outputs of the pumps to zero. The winding of winches 39 and 40 is terminated and thereafter the fluid flow direction produced by the pumps is slowly reversed so that the wire 38 can be returned to its original starting point and another object 36 can be engaged with wire 38 by means of a hook means 37.

Since a very high horsepower is needed to accelerate and catapult object 36, and since it is difficult to fly very high power units to small landing strips, it is desirable to use a plurality of smaller power plants rather than one large power plant. Thus, in FIG. 5, three power plants are provided and are connected in parallel with each other. However, any other number of power plants could be provided in accordance with the required power output, such as two power plants, five power plants, or any desired number of power plants with their associated motors and intermediate casings such as 203. As these units are relatively small, they can readily be flown to distant areas having relatively small landing strips, and the catapult means assembled on the site.

There is another important advantage of the present invention. If, for example, the driving motors have a certain horsepower such as 1000 horsepower, but the pumps, during the short time of acceleration or catapulting require a larger output, such as 5000 horsepower, the revolving mass concentrations in the intermediate casings, due to their high angular velocity, store a high kinetic energy so that this kinetic energy is available to assist in driving the pumps during the short time peak demand. Thus, in the above example, each pump may require 1000 horsepower from its drive motor for most of the time and may take 4000 horsepower for a short time from the kinetic energy stored in the revolving mass concentrations.

The power transferred from the kinetic energy of the revolving mass concentrations, during the short time peak demands, may be several times higher than the available power of the driving motors. For example, if the driving motors are 1000 horsepower and if the power plants are revolving at 2000 to 10,000 r.p.m., then 2000 or even 5000 horsepower can be derived from the revolving mass concentrations over a short peak demand time interval. The angular velocity of the revolving mass concentrations would decrease slightly, for example, from 2000 or 10,000 r.p.m. down to 1800 or 9,000 r.p.m., depending on the size, angular velocity and mass of the mass concentrations.

During the time when no catapulting operation is taking place, and when the wires are returned for engagement with the next object to be catapulated, the power plants continue to supply power to the revolving mass concentrations and thus gradually build up the angular velocity of these mass concentrations to the desired velocities of, for example, 2000 or 10,000 r.p.m. If the conversion of the kinetic energy into fluid pressure energy during the short time peak demand has reduced the angular velocity of the revolving mass concentrations substantially, then a considerably longer time is required to again build up the kinetic energy stored in the revolving mass concentrations. The time required to restore the kinetic energy is proportional to the amount of kinetic energy transformed into fluid pressure energy.

It would be understood that the catapulating means shown in FIG. 5 is exemplary only, in that it would be possible to provide more than two winches and a different number of power plants. Furthermore, the "delivery passages" may become "return passages" if the delivery direction of a pump is reversed, and vice versa.

FIGS. 6 and 7 illustrate novel means for accelerating arresting wires used to decelerate planes landing on landing strips or on aircraft carriers. It is known to decelerate flying objects or aircrafts such as 53 and 753 by providing the same with landing hooks such as 54 or 754 which engage arresting wires 55, 56, 57 or 58, or 755, 756, 757, or 758, respectively, to bring the flying object or aircraft to a sudden stop. The wires commonly have a predetermined flexibility, or else they are connected by transmission means, such as a ram or rams, operating in an accumulator or in accumulators so that the wires gradually decelerate the object and bring it to rest in a short distance.

Known types of arresting gears work satisfactory as long as the approach velocity of the aircraft is limited to certain values such as, for example, 125 or 150 knots. However, with the increase in aircraft speeds, the landing speeds also increase to values of as high as 150 to 200 knots. At these speeds, when the hooks 54 or 754 engage the arresting wires, the wires tend to break due to the too high speed of the aircraft relative to that of the respective arresting wire.

If the wires can be accelerated to a certain speed before they are engaged by the arresting hooks of the aircraft, then the speed of the aircraft relative to the arresting wire, at the time of engagement of its hook with a wire, can be substantially less than the actual aircraft speed. Thus, with the arrangements of FIGS. 6 and 7, the arresting wires are accelerated to a certain speed, for example, 15 knots or higher, depending on the speed of the approaching aircraft. However, such acceleration of the wires has to take place very rapidly since there is only a short distance involved in the entire stroke of the wire. For this reason, one or more sensing devices 52 or 752 are used at the approach end of strip 51 to sense the approach of an aircraft. A plurality of such sensing devices may be used in order to compute the aircraft speed and thus the time before the arresting hook engages the wire.

Element 51 is the landing strip or a ship or aircraft carrier, on which the arresting wires and the arresting mechanism, as well as the wire accelerating means of the invention, are assembled. In the embodiment of FIG. 6, each of the wires, such as the wire 55, is trained over a pair of roll means 63 each connected to a ram means 60 or 62. The ram means may be single acting or double acting, and each ram or piston is operable in an associated cylinder 59 or 61. Thus, if fluid under pressure is supplied to these cylinders, then the associated pistons or rams are forced outwardly and, if fluid is withdrawn from behind the pistons or rams, the latter are drawn back into the associated cylinders. As the rams or pistons are advanced, the roll means 63 are advanced and thus the associated wires are moved forwardly.

If an aircraft approaches the landing area 51, as soon as it is sensed by the sensing device, a command is given to a hydraulic drive means for supplying fluid to cylinders 59 and 61 to advance the respective piston means 60 or 62. Preferably, at least two piston means are used in laterally spaced relation so that the aircraft 53 can pass between the actuators to engage the wire, such as the wire 55, and so that the entire wire is moved forwardly. For this reason, in accordance with the invention, dual output or multiple output pumps are included in the power means to provide two or more fluid flows of proportional or equal volume to supply fluid to the cylinder means 59 and 61 to accelerate the associated piston means 60 and 62 at equal velocity to assure a suitable acceleration of the associated arresting wire.

After the aircraft flows over the sensing devices 52 or 752, a command is given to respective control means on respective pumps to start the supply of fluid to the connected cylinders. This is effected in such a manner that, as hook 54 engages wire 55, the outputs of the associated pumps are sufficient that the wire 55 has the required predetermined speed as it is engaged by the hook 54. If the aircraft, in passing over the wire 55, is at too great a height for its hook 54 to engage this wire, then the hook 54 will engage the next wire 56 and, so on. However, all four wires 55, 56, 57 and 58 have been accelerated, starting at successive time intervals one after the other in accordance with the approach velocity of the aircraft. Specifically, each wire is accelerated to a predetermined velocity starting at a predetermined time by two flows of fluid under pressure and of equal or proportional volume. Once a wire has attained its predetermined velocity, it may continue to be advanced at this velocity for a certain period of time. Therefore, control elements have to be set so that they are actuated by the sensing means 52 in such a manner that the acceleration of the respective wires occurs successively and at such a time that each wire has attained its final velocity at the time it is engaged by the hook 54 of aircraft 53.

The embodiment of FIG. 7 differs from that of FIG. 6 only that wires 755, 756, 757 and 758, instead of being accelerated by piston means 60 or 62, are accelerated by winch means 64 drive by respective hydraulic motors 65. Each winch means 64 winds up a respective wire 98 or 99 which draws forwardly a respective roll means 763 over which the arresting wire is trained. Wires 98 and 99 could be wound on the same winch means 64, or could be wound on separate winches 64. In this case, the supply of fluid to the respective motors 65 must have the same volume or proportional volumes so that both motors drive the associated winches with a proportional or equal speed to produce an accurate winding of wires 98 and 99 so that the associated arresting gear wires are properly accelerated. The arresting operation is otherwise the same as described for FIG. 6.

The embodiments of FIGS. 6 and 7 are operated by the same kind of power plants. The only difference is that, in FIG. 6, roll means 63 is advanced by rams or pistons while, in FIG. 7, roll means 763 are advanced by the traction wires 98 and 99 wound on the winches 64 driven by hydraulic motors 65. For driving or accelerating the arresting wires, one or more driving motors 701 are provided and each motor drives a respective pump 702 through a respective revolving mass concentration inside an intermediate casing 703. Fluid is supplied to each pump through a suction or intake passage 74, and each pump has a respective controller 730 for controlling the output between zero and maximum. Each pump has one output or delivery line connected to a common supply line 72 and its other output or delivery line connected to a common supply line 73, so that the flows through lines 72 and 73 are proportional or equal. If the flow in one line is increased, then the flow in the other line is increased proportionally and, if the flow in one line is decreased, then the flow in the other line is also proportionally decreased. Associated with each pump is an actuator means 66 operating a respective control valve means 67, each control valve means being operable to change the delivery directions of two fluid flows. Thus, each control valve means 67 is provided with a plurality of fluid flow means 68, 69, 70 and 71.

Lines 68 and 69 connect to the motor 65 of one winch 64, while lines 70 and 71 connect to the motor 65 of the other winch. One passage 68 or 69 is a supply line while the other is a return line, and one passage 70 is a supply line while the other is a return line. The flow directions are reversed by operation of valve means 67 by actuator means 66, and these actuator means are responsive to impulses or commands from sensing devices 52 or 752. The actuator means 66 may be solenoids, magnets, electric motors, or hydraulic or pneumatic actuators which will follow commands from the associated sensing devices. The delivery of such commands is preferably effected electronically.

Upon receipt of a command for accelerating wire 755 from sensing device 752 to controller 730, the pumps start to deliver fluid to the winches. The command signal may result in operation of one pump, some of the pumps, or all of the pumps. The actuator means 66 is operated to move the valve means into a direction such as to effect winding of the wires 98 and 99 on the winches to thereby accelerate the wire 755. After wire 755 has been accelerated to its final speed and continues to move at a certain velocity until either the hook point engages it or the aircraft has flown over it, actuator means 66 sets valve means 67 into a neutral position so that motion of wire 755 is discontinued. The same operation occurs for the other wires 756, 757 and 758. After completion of the arresting procedure, actuator means 66 reverse the position of valve means 67 so that all of the wires 98 and 99 are wound off the associated winch means 64 so that the arresting wires may be moved back to their starting position.

Each of the fluid drive units 701-702-703 may be similar to those already described. The driving motors 701 do not have a sufficient capacity to furnish the peak power, and the peak power is supplied with the help of the kinetic energy stored in the mass concentrations rotating at a high angular velocity. For example, relatively small motors, such as 240 horsepower motors, can be used even though the connected pump delivers, during the short time peak demands, about 800 or more horsepower to properly accelerate the wires.

It will be appreciated that, instead of four fluid drive units, more or less than four can be used in the embodiments of FIGS. 6 and 7 in accordance with the requirements. Furthermore, instead of all the fluid drive units being associated in a single battery connected to the same supply lines, the units could be divided into several batteries whose outputs, in turn, could be connected to the common supply lines such as 72 and 73. With the arrangements of FIGS. 6 and 7, the arresting wires can be precisely accelerated to a predetermined final velocity to decrease the speed differential between the aircraft and the arresting wires and thereby prevent breaking of the arresting wires. Tests have shown that the output of each pump can be changed from zero to a maximum in a few milliseconds.

In FIG. 8, the fluid drive of the invention is illustrated as applied to a machine for catapulting or arresting flying objects such as aircraft, rockets, balls, other vehicles, and the like. The apparatus shown in FIG. 8 includes a body 74 having an upper plane surface 851 on which the catapulting or recovering body 75 is longitudinally movable. Body 75 may have a recess 76, or other retaining, fastening, or supporting means to support an object to be launched or to receive an airborne object.

To launch an object 853, the latter is set into recess 76 and body 77 is moved backward to the extreme right end of surface 851 as viewed in FIG. 8. Body 75 is then accelerated in a forward direction, or to the left in FIG. 8, and to such a high velocity that object 853 becomes airborne either because it is provided with wings or because it is catapulted from body 74. After launching of the object, body 75 has its movement arrested.

Body 75 can also serve to recover a flying body and, for this purpose, is also moved into its extreme righthand position and remains there until the flying object 853 approaches plant 74. As soon as object 853 nears plant 74, a sensing device senses object 853 and starts the acceleration of body 75. As the flying object comes nearer to body 75, it is also descending until it finally lands or comes to rest in recess 76. To obtain a soft recovery of flying object 853, it is necessary that body 75 is accelerated to an extent that it has nearly the same forward speed as object 853 when the latter descends into recess 76. After object 853 has landed in recess 76, the still moving body 75 is slowly decelerated so as to come to a halt before reaching the left end of plant 74. Thereafter, body 75 may be returned to its starting position, if desired. Instead of the launching or recovering being effected in a direction from right to left, as in FIG. 8, launching or recovering may also be effected in the direction from left to right.

Movement of body 75 is effected by two wires 77 and 78 which extend substantially the entire length of surface 851 in spaced parallel relation, and are trained over roller means 80 and 81. Each wire is connected to a pair of winch means, there being four winch means of which three are illustrated in FIG. 8 at 82, 83 and 84. Wire 77 is secured to one side of body 75 and connected to a winch means 83 and also to a second winch means which is not shown but which bears the same positional relation to winch 84 as winch 83 does to winch 82. The wire 77 is preferably an endless wire. The wire may be trained around the drums of its two associated winches or may be secured to its associated winches or clutched thereto, as by friction means. The only requirement is that the winches be, when rotating, able to drive wire 77. Wire 88 is secured to the other side of body 75 and is operated by winches 82 and 84 in the same manner as described for wire 77 with respect to its pair of winches.

Flying objects such as the object 853 may approach the recovering plant at about 50 to 300 knots, and may be launched at about 50 to 300 knots. In addition, these flying objects may be very heavy, for example, they may weigh from several thousand pounds to even several hundred thousand pounds. Consequently, the high power is necessary to accelerate and decelerate body 75 in a very short time interval which is mostly of the order of a few hundred milliseconds.

To provide this power in the arrangement shown in FIG. 8, two driving motors 81 are mounted within body 74 and each driving motor is connected by an intermediate housing 803 to a rotary fluid pump 802, the casing 803 enclosing the revolving mass concentrations. However, two drive units are illustrated only by way of example, as the number of drive units used depends upon the power required, and instead of only two drive units as many as several hundred drive units could be provided in body 74.

Each pump 802 has a rotor 92 rotatably supported therein and formed with two groups of radial cylinders, the groups being axially spaced and each including a plurality of radially extending cylinders. Each cylinder has a piston reciprocable therein to draw fluid into and expel fluid from the respective cylinders, the pistons being actuated by guide means 93. These guide means 93 can be adjusted from zero eccentricity to a maximum positive eccentricity or a maximum negative eccentricity so that the output of each pump 802 is completely variable and reversible. Each cylinder group has an inlet passage and a discharge passage, such as the passages 94 and 95. Each passage 94 and 95 can be an inlet passage or a discharge passage depending upon the direction of the pump eccentricity. The other cylinder group in rotor 92 has entrance-exit passage 96 and 97 acting similar to passages 94 and 95.

A control means 89 is connected to the piston guide means 93 and may comprise a piston moving in a double acting cylinder of a controller. Passages 90 and 91 interconnect corresponding chambers of the two cylinders of control means 89 so that, if fluid pressure is supplied to passage 90, the pistons may move guide means 93 downwards and, if pressure is supplied through passage 91, the pistons may move guide means 93 upwards. Thereby, the delivery volume and the direction of flow of fluid of the pump means 82 may be selected.

Valve means 87 are provided to actuate the delivery adjustment devices of the pumps, and may be supplied with fluid under pressure from suitable means such as a fluid supply means, a pump, or an accumulator 85. Valve means 87 is actuated by an actuator 88 which may be a solenoid, an electromotor, a hydraulic or pneumatic actuator, or any other type of actuator. This actuator means 88 may be made responsive to a sensing device sensing the approach of flying objects, or a command for launching an object, and then actuates valve means 87 to select the direction and rate of flow of fluid. The fluid may flow from supply 85 through line 86 to valve 87 and thence into one of the passages 90 and 91 to adjust the volume and direction of fluid flow from pumps 802. Under certain circumstances, fluid may be delivered simultaneously to both passages 90 and 91.

Passages 96 and 97 are connected, by means not shown in the drawings, to the inlets and outlets of hydraulic motor means 79 driving the winch means 82 and 84, and passages 94 and 95 are similarly connected, also by means not shown in the drawings, to the inlets and outlets of motor means 79 driving the winches such as 83 connected to the cable or wire 77. Since one of the cylinder groups of each pump 802 is connected to winches 82 or 84, while the other cylinder group of each pump 802 is connected to winch 83 or to the two winches connected to wire 77, it is assured, since both cylinder groups of the same pump 802 supply fluid flows of equal or proportional delivery volume, that all of the winches revolve with the same or with a proportional velocity. Thus, a proper acceleration of body 75 is assured by the equal or proportional movement of wires 77 and 78.

To accelerate body 75, the pump eccentricity or delivery adjustment device 89 are actuated in a manner such that the pumps supply a suitable quantity of fluid. To decelerate or slow down body 75, the outputs of pumps 82 are decreased or regulated down by control means 89. Driving means 801 gradually increase the angular velocity of the mass concentrations connected thereto and rotatable therewith and contained in the associated housing 803. Since the rotary mass concentrations, in practice, are very heavy, the driving motor needs a certain time to gradually accelerate the mass concentration to their desired angular velocity.

In practice, the kinetic energy generated in the revolving mass concentrations may be many times higher than the power of the driving motors, and this is the reason why time is required to gradually build up the angular velocity of the revolving mass concentrations. As soon as full speed of the revolving mass concentrations has been obtained, the launching or recovering plant 74 is ready for operation. In rapid acceleration or deceleration of body 75, a part of the energy for driving each pump 802 is derived from the associated driving means 801, but the far larger part of the required energy is in the form of the kinetic energy of the mass concentrations in revolving in casings 803. To make possible the launching or recovering of heavy high speed flying objects, the hydraulic motors on the winches must be made sufficiently large, or more than one motor must be used for each winch.

During recovery of a flying body, the kinetic energy delivered by the recovered object or body to the body 75 can be transferred, through the wires 77 and 78, the winches and the winch driving motors, to the pumps 82 and, through these pumps result in an increase in the angular velocity of the revolving mass concentrations in the associated casings 803. Thus, if each launching follows a recovery of the same flying object, the energy recovered during recovery of the flying object can be used for launching. The plant can then operate very economically, using its own power only for the purpose of making up losses, such as friction losses and the like.

FIG. 8 illustrates only an exemplary embodiment of the invention, as the launching and recovering device could have any other kind of configuration desired, such as a plane. In such case, the driving means could be set laterally of the plane, with the plane still being provided with a launching body 75 movable longitudinally of the plane and driven by the fluid drives of the invention.

FIG. 9 illustrates another embodiment of the revolving masses. Shaft 1001 of motor 901 extends into a bore of a shaft 1103 and is keyed to shaft 1103 by a key 1101. Shaft 1002 of pump 902 extends into an axial bore in the opposite end of shaft 1103 and is keyed to shaft 1103 by a key 1102. Pump 902 is fastened to one end of intermediate casing 903, and motor 901 is fastened to the other end of intermediate casing, the three elements being securely fastened together and mounted on a common support flange 1003.

Bearing 910 in casing 903 rotatably support shaft or revolving body 1103, and the latter is provided with a peripheral flange 1303 adjacent one end. The outer periphery of shaft 1103 supports a plurality of mass concentrations comprising disks 1503, 1603, 1703, 1803, 1903 and 2003 which are secured to rotate with shaft 1103 by key 1203. The disk assembly bears, at one axial end, against flange 1303 and is retained in position by a distance sleeve 1403 engaging between the opposite end of the disk assembly and the righthand bearing 910. The disks thus revolve, together with body or shaft 1103 in casing 903.

The principal feature of the embodiment of FIG. 9 is that a plurality of disks can be used to provide the revolving mass concentrations. The individual masses are thus not too heavy for transport by aircraft or to remote places having relatively short landing strips. The disks can be easily assembled onto revolving shaft or body 1103. Another feature is that shaft 1103 and casing 903 can be produced in standard sizes and, depending upon the amount of kinetic energy to be stored, a smaller or larger number of disks can be set onto shaft 1103. Obviously, the mass concentration construction of FIG. 9 may be used in any one of the different embodiments of the invention.

Since unusually high horsepower, torques and pressures are needed over short periods, to the extent that they are almost like impulses, only very strong and resistant pumps can withstand the sudden loads exerted onto the pump parts if the high kinetic energy of the revolving mass concentrations is suddenly transferred into the pump to be transformed into a flow of fluid under pressure. It is therefore necessary to provide suitable pumps having a high power and a high strength in the fluid drive units of the invention.

FIGS. 10 and 11 illustrate a rotary fluid pump which is able to withstand the highest impulses and highest sudden kinetic energy loadings. In these figures, housing 2003 is the casing in which the kinetic energy storage means is located, and housing 132 of the pump may be fastened by bolt means or the like 121 to casing 2003. Casing 2003 may have end flanges 125 carrying anti-friction bearings 124 rotatably supporting a revolving shaft 122. Shaft 122 may be provided with a key 123 engaging in respective mass concentrations 127 through 131 mounted on shaft 122. These mass concentration disks may abut a flange 225 of shaft 122 and be held thereagainst by suitable means. Additionally, the several mass concentration disks may be secured together by suitable retaining means. Shaft 122 is clutched to pump shaft 150 and to the shaft of the driving motor by suitable clutch means. The connection to the driving motor is not illustrated in FIGS. 10 and 11. Thus, as the driving motor rotates shaft 122, shaft 122 rotates shaft 150 of the pump.

Shaft 150 may be, for example, integral with a rotor 144 or may be connected thereto. Two cylinder groups are formed in rotor 144, each group including a plurality of substantially radially extending cylinders 145 each supporting a respective radial piston 146 for reciprocation radially inwardly and outwardly. Each piston 146 is provided with a piston shoe 147 having guide means 148 and 149. The piston shoes and thus the pistons 146 are radially reciprocated by the displaceable actuator ring 141 which is carried by supporting rings 143 mounted in suitable bearing means 140 so that they can rotate. Bearing means 140 are provided in an eccentricity adjustment or fluid delivery quantity adjustment means 139 which can slide vertically in the pump. By the means 139, the pump delivery is set to a zero position if the means 139 is centered, or can be set to a maximum delivery in either one of two different directions. Pump housing 132 is provided with a back cover means 134 and a front cover means 133, back cover means 134 supporting bearing means 152 for rotor 144. Cover means 133 also supports a bearing means 151 for supporting shaft 150 and thus rotor 144, whereby the rotor can rotate in bearings 151 and 152. Cover 134 is also formed with entrance or exit passage means 135 and 136, and cover 133 is provided with entrance or exit passage means or ports 137 and 138.

A control body 153 is provided between front cover 133 and rotor 144, and has ports 162 for constituting entrance and exit ports for flow of fluid from the passage means in front cover 133 to rotor port 161 and thence into the respective cylinders 156 of the right-hand cylinder group in rotor 144. Another control disk 253 is provided between the inner end of a sleeve 155 in back or outer cover 134 and rotor 144, and is formed with at least two control ports serving as entrance and exit ports for fluid flow through rotor ports 161 into the respective cylinders 145 of the left cylinder group of rotor 144.

The cylinders of the left cylinder group do not communicate with the cylinders of the right cylinder group. A further feature is the adjustment or balancing body or sleeve 155 which is subjected at one end to fluid pressure through chambers 160 and 161 to be pressed axially against control body 253 to press this control body against rotor 144. In turn, rotor 144 is pressed against control body 153 and the latter is pressed against front cover 133. Control bodies 153 and 253 are stationary and have stationary control faces 154 which slide along rotating control faces of rotor 144. The control faces 154 of the pump embodiment shown in FIGS. 10 and 11 are preferably spherical and the outer faces of the control bodies are planar in a radial plane which allows limited sliding movement in a radial direction on plane faces of covers 133 and 134. However, the control faces could also be plane, cylindrical, or conical, depending on design requirements. Control bodies 153 and 253 can thus move to a limited extent in a radial direction if very heavy loads deform the axis of rotor 144. The spherical control faces prevent tilting between rotor 144 and control bodies 153 and 253 also in such cases when the axis of rotor 144 should deform under sudden heavy radial loads inside the respective cylinders 145 or 156.

The output of the illustrated pump may be increased from zero to maximum or vice versa, and can reverse from one direction of flow to the other, in fractions of a second or milliseconds. Since the pressure inside the cylinders may change suddenly from zero to many thousand p.s.i., it is necessary that the pistons and the guide means actuating the pistons be so strong that they will not deform, break or tilt under heavy loading occurring suddenly in milliseconds or fractions of a second. For this purpose, the pistons have transverse bores receiving transverse trunnions on the associated piston shoes so that the associated piston shoes may pivot inside the transverse bores of the pistons 146. The transverse bores have radially outwardly opening recesses so that a portion of the associated piston shoe may extend therethrough. The completely cylindrical face-to-face contact between each trunnion and the transverse bore of the associated piston assures the capability of supporting heavy loadings without sticking or tilting, due to the perfect surface contact.

It is also important that pistons 146 must be guided completely between the walls of the respective cylinders and, that the pistons never extend too far out of the cylinders. For this purpose, cylindrical wall guide extensions 158 are provided on the rotor means.

In order to obtain compact sizes of the pumps, necessary in order that the pumps may revolve at high speeds without exceeding the allowable relative speeds between moving parts, the rotary actuator ring 141 is provided with annular grooves 142, and rotor 144 is provided with radially projecting circumferentially extending ribs 164 formed with guide faces 158. These radial extensions 164 of the rotor enter, during rotation of the rotor, into the annular grooves 142 of ring 141. Thereby a long piston stroke, which is necessary in order to assure a high output of the pump, is obtained. The radial displacement of each piston 146 is assured by the piston shoes 147 having the guide means 148 and 149. These guide means, and piston shoes 147, have outer guide faces 166 which are guided along the inner surface 167 of the revolving ring 141.

An outstanding feature of the pump shown in FIGS. 10 and 11 is that all relatively moving parts and all actuator means have perfect face-to-face contact or perfect guidance so that not the slightest tilting can appear irrespective of how heavy the sudden loading against the rotor, pistons, piston shoes, or actuator means may be. In order to obtain still smoother relative movements of the parts, balancing or lubricating recesses and communication passage means can be provided. The pump of FIGS. 10 and 11, or parts thereof, is described in greater detail in my copending U.S. patent applications Serial Nos. 461,483, 389,130, and others and partially in my U.S. Patents 3,223,046, 3,225,706, 3,270,685, and 3,277,834.

A very high efficiency fluid handling device, characterized by the highest power output, highest velocity, high uniformity of flow, and substantially no leakage or slip, is described in my U.S. Patents 3,249,060 and 3,273,511. This fluid handling device can also be used effectively in the fluid power generating, transmitting and utilizing systems of the present invention.

The pump of FIGS. 10 and 11 is especially suitable for the embodiments of the invention shown in FIGS. 4, 5, 6, 7 and 8, and other pump means could also be used in these embodiments, such as the pump means of my German Patent No. 1,176,942. Furthermore, other pump means such as axial plunger or vane-type pumps could be used in some of the embodiments, but these have only a limited capacity for transforming sudden energy impulses and would consequently be limited to applications where high energy power pulses are required. It is therefore highly preferable to provide, in the embodiments such as shown in FIGS. 5, 6, 7 and 8, pump means similar, at least in principle, to the pump shown in FIGS. 10 and 11.

While several different embodiments of the invention have been shown and described, it should be understood that it is possible to interchange parts of the embodiments with each other. For example, rams could be replaced with winches, or vice versa, within the scope of the invention. Additionally, the kinetic energy transforming fluid drive of the invention may be applied to forging hammers, construction machines, accelerators, or other machines or vehicles which need a sudden short time high power.

Thus, while such specific embodiments have been shown and described to illustrate the application of the principles of the invention, it should be understood that the invention may be embodied otherwise without departing from such principles.

What I claim is:

1. A kinetic energy transforming fluid drive comprising, in combination, a relatively small diameter, high speed, relatively low power driving motor (1) including a housing and an output shaft (5) extending from said housing; a relatively small diameter rotary fluid pump (2) including a housing, a rotor rotatably mounted in said housing and a rotor driving shaft (6) projecting from the pump housing; a relatively small diameter casing (3) positioned between and interconnecting said housing, and defining a closed substantially cylindrical interior space (26); said shafts extending in coaxial opposed relation into said casing; means coupling said shafts within said space for conjoint rotation; and a relatively small diameter wheel (7) positioned in said space and mounted on at least one of said shafts for rotation thereby, said wheel having a mass concentration (4) extending around its periphery at a substantial radial spacing from its axis; said wheel being brought up to a high angular velocity by said motor when the loading on said pump is zero or at a relatively low value, whereby a high kinetic energy is developed and stored in said mass concentration; said kinetic energy, when the loading on said pump exceeds the power of said motor, supplying the excess energy requirements of said pump and being thus transformed into fluid energy at the output of said pump.

2. A kinetic energy proportionate transforming fluid drive comprising, in combination, a driving motor (1) including a housing and a rotating shaft (5) extending from said housing; a rotary fluid pump (2) including a housing, a rotor rotatably mounted in said housing and a rotor driving shaft (6) projecting from the pump housing; said pump developing at least two separate fluid outputs which are proportionate in pressure and rate of flow; at least a pair of fluid power-driven actuators (45–47 and 46–48) each connected to a respective output of said pump, whereby said actuators are operated in coordinated relation; a casing (3) positioned between and interconnecting said housings, and defining an interior space (26); said shafts extending in coaxial opposed relation into said casing; means coupling said shafts within said space for conjoint rotation; a wheel (7) positioned in said space and mounted on at least one of said shafts for rotation thereby, said wheel having a mass concentration (4) extending around its periphery at a substantial radial spacing from its axis; said wheel being brought up to a high angular velocity by said motor when the loading on said pump is zero or at a relatively low value, whereby a high kinetic energy is developed and stored in said mass concentration; said kinetic energy, when the loading on said pump exceeds the power of said driving motor, furnishing the excess power requirements of said pump and being thereby converted into fluid energy in separate fluid flows of proportionate energy content at the outputs of said pump.

3. A kinetic energy transforming fluid drive comprising, in combination, a driving motor (1) having an output shaft (5); a rotary fluid pump including a housing (132) and a rotor (144) rotatably mounted in said housing and coupled to said output shaft for rotation by said driving motor; said rotor having at least two axially spaced groups of radial cylinders (145 and 156), with each cylinder having a piston (146) reciprocable therein radially of said rotor; guide means (147) operatively associated with said pistons and operable, upon rotation of said rotor, to reciprocate said pistons radially; respective passage means (135, 136 and 137, 138) each associated with a respective group of cylinders and each extending through a stationary part of said pump and communicating with the cylinders of the respective group through an entrance means (161) in said rotor communicating with an entrance means (162) in a stationary part of said pump, each passage means including an intake passage for the cylinders of the associated group and an output passage for the cylinders of the associated group and delivering fluid under pressure; rotary mass concentration means (127–131) rotated by said driving motor output shaft during rotation of said pump rotor, said rotary mass concentration means being brought up to a high angular velocity by said motor when the loading on said pump is zero or at a relatively low value, whereby a high kinetic energy is developed and stored in said rotary mass concentration means; and at least a pair of fluid power driven actuators each connected to a respective output of said pump for conjoint coordinated operation of said fluid pressure actuators by said pump.

4. The fluid drive of claim 3 wherein said pump is a variable multi-flow pump.

5. The fluid drive of claim 4 wherein said guide means is adjustable.

6. The fluid drive of claim 3 wherein said pump means supplies flows of fluid of equal or proportional delivery quantity to said actuators regardless of the pressure in the different flows.

7. The fluid drive of claim 1, including a fluid press connected to the output of said pump.

8. The fluid drive of claim 1, including a fluid power-driven casting machine connected to the output of said pump.

9. The fluid drive of claim 3, wherein said actuators comprise fluid pressure rams operatively connected to the movable element of a machine and conjointly operating said movable element.

10. Apparatus for launching and recovering airborne objects comprising, in combination, a launching and recovering element (75) movable longitudinally of a path during launching and recovering operations and capable of rapid acceleration to the object launching speed and to a speed of the order of the approach speed of an airborne object; driving means (77, 78 and 82, 83, 84) connected to said element and operable to accelerate said element along said path and to decelerate said element; at least one fluid handling actuator (79) operable to actuate said driving means; and at least one kinetic energy transforming fluid drive supplying fluid under pressure to said actuators; each kinetic energy transforming fluid drive comprising a driving motor (801) having an output shaft (5), a rotary fluid pump (802) including a housing (89) and a rotor (92) rotatably mounted in said housing and driven by said output shaft, and rotatable mass concentration means rotated by said driving motor during rotation of said rotor, said rotating mass concentration means being brought up to a high angular velocity by said motor when said element is substantially stationary and the loading on said pump is substantially zero, whereby a high kinetic energy is developed and stored in said mass concentration means; the loading on each pump, during acceleration of said element, substantially exceeding the power of the associated driving motor and said stored kinetic energy, during acceleration of said element, providing the excess energy required to drive the associated pump to pick up said increased loading and being converted into fluid energy at the output of the associated pump.

11. The launching and recovering apparatus of claim 10 wherein said actuators work with equal or proportional velocity due to the drive thereof by a multiple respective flows of fluid under pressure and of equal proportional flow quantity.

12. The launching and recovering apparatus of claim 10 wherein said actuators are hydraulic rams.

13. The launching and recovering apparatus of claim 10 wherein said driving means are winches driven by hydraulic motors constituting said actuators.

14. The launching and recovering apparatus of claim 10 wherein said driving means are hydraulically operated rams for accelerating arresting wires of an arresting gear for approaching airborne objects, said arresting wires constituting said element.

15. The launching and recovering apparatus of claim 10, including an elongated surface supporting said element, said path extending along said surface.

16. The launching and recovering apparatus of claim 10, wherein the kinetic energy of said element is, during deceleration of said element, converted through said driving means, said fluid handling actuators and said pumps into a higher angular velocity of said rotating mass concentration means.

17. The launching and recovering device of claim 10, including an output adjustment device operatively associated with each pump, said adjustment devices operating to decelerate said element by decreasing the fluid supply to said fluid handling actuators.

18. A kinetic energy transforming fluid drive, as claimed in claim 1, including plural fluid power-driven actuators; a common supply line for said actuators; a common return line for said actuators; and plural of said kinetic energy transforming fluid drives connected in parallel to said common supply line and said common return line.

19. A kinetic energy transforming fluid drive, as claimed in claim 1, wherein the output of said pump is reversible.

References Cited by the Examiner

UNITED STATES PATENTS

| | | | |
|---|---|---|---|
| 376,383 | 1/1888 | Higginson | 60—52 |
| 1,288,956 | 2/1940 | Norin et al. | 60—52 |
| 2,382,437 | 8/1945 | Molley | 60—52 X |
| 2,926,872 | 3/1960 | Fulton et al. | 244—63 |
| 3,033,498 | 5/1962 | Baas | 244—110 |

FOREIGN PATENTS 20,271    1907    Great Britain.

EDGAR W. GEOGHEGAN, *Primary Examiner.*